United States Patent Office 3,495,943
Patented Feb. 17, 1970

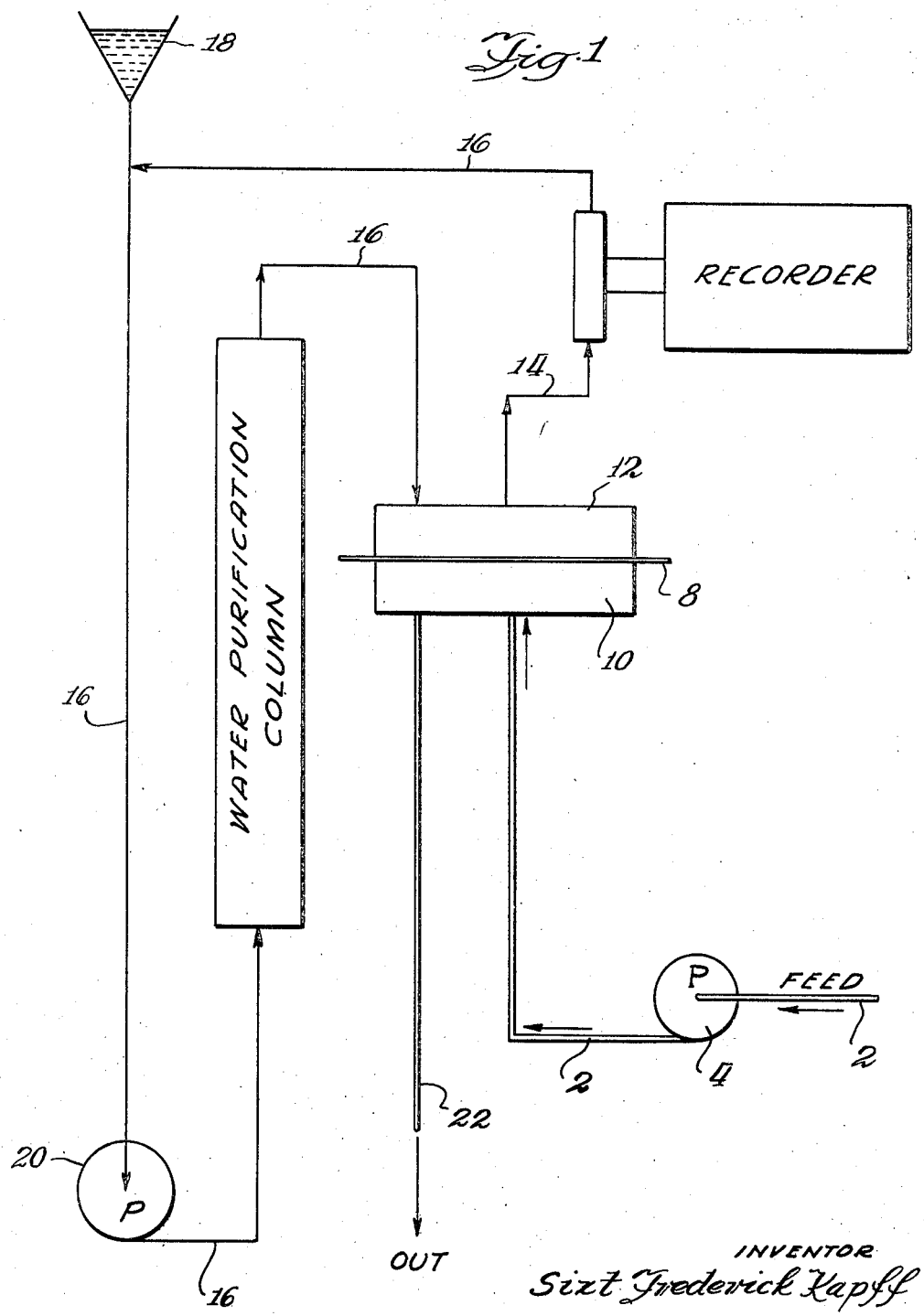

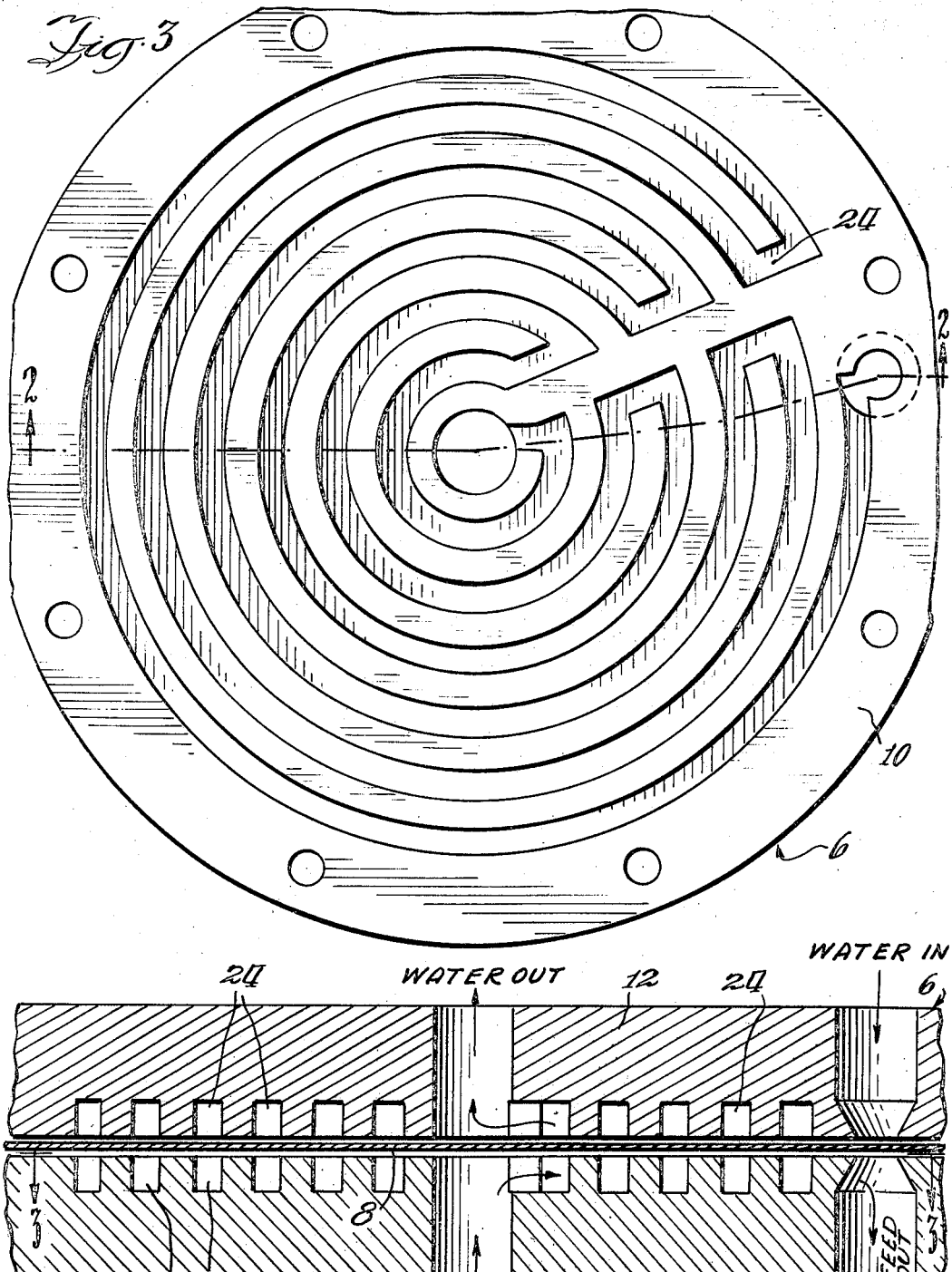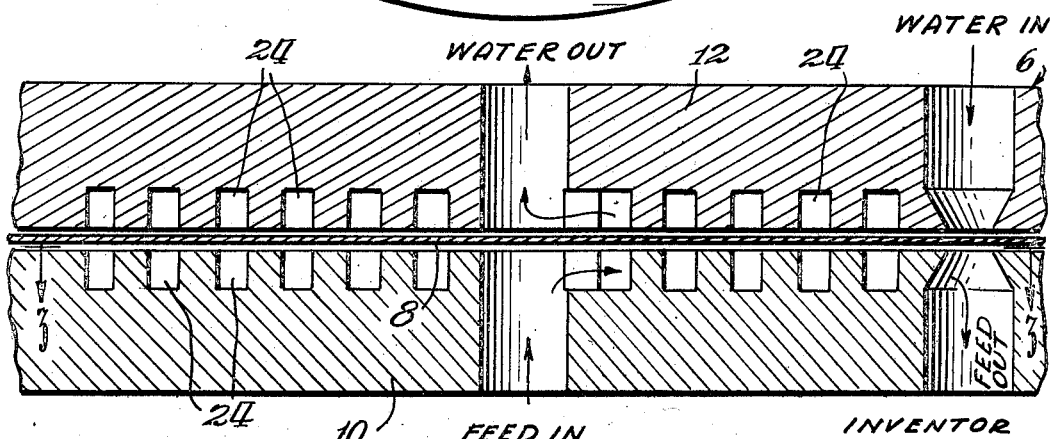

3,495,943
PROCESS AND APPARATUS FOR DETECTION OF IONIC CONTAMINANTS
Sixt Frederick Kapff, Homewood, Ill., assignor to Standard Oil Company, Chicago, Ill., a corporation of Indiana
Filed Nov. 30, 1966, Ser. No. 598,099
Int. Cl. B01d *13/00;* G01n *33/00, 31/06*
U.S. Cl. 23—230                                                12 Claims

ABSTRACT OF THE DISCLOSURE

An apparatus and process for determining the concentration of water-soluble ionic contaminants contained in fluid hydrocarbons, which process comprises, intimately contacting water which is free of water-soluble ionic contaminants with one side of a hydrophilic membrane, simultaneously intimately contacting the fluid hydrocarbons with the other side of the hydrophilic membrane for a time sufficient to cause the water-soluble ionic contaminants contained in the fluid hydrocarbons to diffuse through the membrane into the water, and electrically determining the concentration of water-soluble ionic contaminants contained in said water after diffusion of said water-soluble ionic contaminants, the concentration of said water-soluble ionic contaminants being a measure of the water-soluble ionic contaminants originally contained in the fluid hydrocarbons.

---

This invention relates to an improved process and apparatus for dialysis. More specifically, the process and apparatus of this invention relates to a novel form of dialysis to determine the concentration of water-soluble ionic contaminants contained in fluid hydrocarbons. In addition, this invention provides a novel diffusion cell which may be used in the improved process and apparatus described herein.

In many wet treating processes, such as copper chloride sweetening, inhibitor sweetening, caustic washing, etc. which are common to the petroleum industry, for example, petroleum products are contacted with water solutions containing inorganic chemicals. After the treating process it is essential to wash the treating solution from the product in order to avoid product degradation. In the past there has been no simple test to determine whether all such contaminants had in fact been removed from the products; this is evidenced, for example, from the frequent reports of contaminated water bottoms in storage tanks at pipeline terminals.

It has now been discovered that this problem may be eliminated or substantially reduced through the utilization of the process and apparatus of this invention. The present invention will accurately and continually determine the concentration of water-soluble ionic contaminants in a stream of fluid hydrocarbons within the range of parts per million. In addition, this invention offers the feature of monitoring the removal of such contaminants.

Briefly stated, this invention provides for a method and apparatus for a two-phase dialysis which determines the concentration of water-soluble ionic contaminants contained in a stream of fluid hydrocarbons. This aspect of the invention comprises intimately contacting water free of water-soluble ionic contaminants with one side of a hydrophilic membrane; simultaneously intimately contacting the fluid hydrocarbons with the other side of the hydrophilic membrane for a time sufficient to cause water-soluble ionic contaminants contained in the fluid hydrocarbons to diffuse through the membrane into the water; and electrically determining the concentration of water-soluble ionic contaminants contained in the fluid hydrocarbons.

As will be explained below, in other of its aspects, this invention may specifically determine the hydrogen ion concentration of the contaminants or the chloride ion concentration of the contaminants. If it is desired to determine the total concentration of contaminants, this may be accomplished by measuring the conductivity of the water after diffusion of the contaminants through the membrane.

In another of its aspects, this invention may be utilized to provide a system in which a product stream may be continually monitored for such contaminants. In this aspect of the invention, water purification means, preferably an ion exchange column, is placed in the system to purify the water after the conductivity determination. The water may then be regenerated for additional dialysis.

In still another of its aspects, this invention provides a novel diffusion cell which may be utilized in the process and apparatus of this invention. The cell comprises a first section and a second section each of which has a top surface and a bottom surface, the sections being adapted to be joined in juxtaposition at their top surfaces; fluid inlet means and fluid outlet means positioned in space relationship in each of the sections, each of the fluid inlet means and fluid outlet means extending from the bottom surface to the top surface in each of the sections; channel means extending in fluid communication across the top surface of each of the sections from the fluid inlet means to the fluid outlet means, the channel means being adapted to channel fluid across the top surface of each of the sections from the fluid inlet means to the fluid outlet means, and the channel means being further adapted to register in symmetrical relationship when the sections are joined in juxtaposition at their top surfaces; and diffusion membrane means adapted to be positioned between the top surfaces of each of the sections separating the channel means of each of the sections, whereby fluid simultaneously entering the fluid inlet means of each of the sections simultaneously contacts the membrane means as it is channeled to the fluid outlet means of each of the sections.

It is to be understood that fluid hydrocarbons include gases and liquids for this invention operates equally well in determining the concentration of water-soluble ionic contaminants contained in gases, as well as ionic gases such as HCl, $CO_2$, or the like contained in gas streams.

The full nature of the invention will be understood from the accompanying drawings and the following description and claims.

FIGURE 1 is an illustration of one embodiment of the process and apparatus of this invention and is presented in flow diagram form.

FIGURE 2 is a cross-sectional view of one embodiment of the diffusion cell of this invention taken along line 2—2 of FIGURE 3.

FIGURE 3 is a plan view of the diffusion cell taken along line 3—3 of FIGURE 2.

FIGURE 1 depicts a monitoring system, in accordance with this invention, in which a stream of fluid hydrocarbons is being continually monitored in order to determine the concentration of water-soluble ionic contaminants contained in the hydrocarbons. In a continuous system line 2 may be tapped into the refinery or product stream to be monitored.

Hydrocarbon feed is pumped through line 2 by pump 4 into diffusion cell 6. Diffusion cell 6 is divided by membrane 8 into hydrocarbon side 10 and water side 12. The novel construction of diffusion cell 6, which may be used as the cell in the embodiment of the invention, will be explained in the discussion of FIGURES 2 and 3. Membrane 8 is a hydrophilic membrane and is preferably constructed of denitrated nitrocellulose.

Water enters water side 12 of diffusion cell 6 through line 16. The water is slowly circulated through side 12 simultaneously with the hydrocarbon feed in side 10. Both, of course are contacting membrane 8. As will be explained in detail below, diffusion cell 6 is so constructed as to allow maximum contact between the water phase and membrane 8 and the hydrocarbon phase and membrane 8. If it is desired to attain maximum accuracy, the contact between each phase and membrane 8 should be for a time sufficient to cause the maximum amount of contaminants contained in the hydrocarbon phase to diffuse through membrane 8 into the water phase.

After the hydrocarbon feed is passed through side 10 in the manner described above, it exits side 10 through line 22 to be replaced in the refinery stream. The water phase containing the contaminants which have diffused through the membrane from the hydrocarbon phase is passed through line 14 into the conductivity cell which is connected to the recorder. The conductivity of the water phase is then determined and recorded. The conductivity determination of the water phase after diffusion is proportional to the concentration of the water-soluble ionic contaminants contained in the hydrocarbon feed. The conductivity cell and recorder mechanism are known in the art and hence a detailed description of each is not necessary. A conventional Brown recorder utilizing a simple Wheatstone bridge circuit may be used. The bridge voltage may be derived from the vibrator socket of the recorder and in this manner the sensitivity may be changed by changing the resistance of a balancing helipot or by using a cell with a different cell constant.

The conductivity determinations may be continually made as the water phase passes through the conductivity cell. Water from the cell is passed through line 16 by pump 20 to the water purification column. By providing reservoir 18 additional water may be added to the system as required. The water purification column may conveniently take the form of a conventional ion-exchange column in which the ionic contaminants are removed from the water phase. After purification the water returns to side 12 of diffusion cell 6 and the process is repeated.

The system's sensitivity to ionic contaminants of the character described has been checked by making standard solutions of ionic compounds in hydrocarbon liquids. One such test determined the ionic concentration of benzoic acid in heater oil. The results of this test established sensitivity at 1 p.p.m. If it is desired to increase sensitivity the water flow may be decreased in order to collect more material per cc., or the water flow may be stopped entirely during the test period. A check of sensitivity utilizing this latter step resulted in increased sensitivity. Additionally, sensitivity may be increased through the utilization of a highly sensitive electrical system.

Since the amount of ionic material diffusing through a membrane depends upon its molecular weight as well as upon its condition—i.e., whether dissolved in the oil, suspended, or present in suspended droplets—the detection limits will not be the same for all streams. Calibration at each installation will be essential if extreme accuracy is needed. If only relative results are important, experience after several installations can be used to define instrument ranges corresponding to satisfactory operations.

Denitrated nitrocellulose 0.0025" thick has been found very satisfactory for the membrane used in this invention. Since it is essential for instrument reproducibility that the membrane characteristics remain constant for long periods,, tests of reproducibility were run periodically. No changes in instrument response to a standard sample were observed after several weeks of testing distillate fuel samples.

Tests have been run to determine instrument response to standard samples such as benzoic acid in heater oil. Samples were pumped through the hydrocarbon side of the diffusion cell until the instrument or recorder reading leveled off. Feed was then switched to a clean heater oil to bring the reading back to zero before introduction of the next sample. The time for the instrument to line out under these conditions is about 10 minutes.

In addition, tests have been made establishing that the process and apparatus of this invention has the sensitivity to follow changes in operations. For example, samples of distillate fuels in finished tankage were tested and the invention was found to have sufficient sensitivity to record daily variations in the amount of water-soluble ionic contaminants present in the tankage.

Although the system has been described with a conductivity cell to detect the material diffused through the membrane, as mentioned above, other detectors such as pH electrodes to determine hydrogen ion concentration, chloride-detecting electrodes to determine chloride ion concentration, etc., may prove more useful in specific applications. These would, of course, be operating in a very clean water system free from hydrocarbon or dirt.

FIGURES 2 and 3 illustrate one embodiment of the diffusion cell of this invention. As stated previously, this cell may be utilized in the process of apparatus heretofore described.

FIGURE 2 is a cross-sectional view of diffusion cell 6 taken along line 2—2 of FIGURE 3. As illustrated in FIGURE 2 the cell comprises half-sections 10 and 12 which are joined together in juxtaposition at their top surfaces. Each of the sections are provided with fluid inlets and outlets which are in space relationship from each other. Channels 24 are cut into the top surface of each of the sections from the fluid inlet to the fluid outlet of each section. Sections 10 and 12 may be made of any convenient material to accomplish this purpose, Teflon, for example, has been found to be very satisfactory. The channels are so cut in each of the sections as to form symmetrical passages when the sections are joined together or are in register with each other. Membrane 8 is positioned between the sections.

The following example will illustrate the operation of the cell. While the example is explicit to the operation of the cell in the process and apparatus of the invention heretofore described, it is to be understood that its operation is not so limited as it may be used in many dialysis operation. Hydrocarbon feed and water simultaneously enter the cell as shown in FIGURE 2. The feed and water are channeled from their respective inlets to their outlets by means of channels 24. Both the feed and water are contacting membrane 8 in their respective sections at the same time. Water-soluble ionic contaminants are diffused through membrane 8 from the hydrocarbon feed into the water. The rate of flow should be controlled in order to attain maximum diffusion. The feed and water then exit the cell through their respective outlets as shown.

FIGURE 3 is a plan view of diffusion cell 6 taken along line 3—3 of FIGURE 2. FIGURE 3 illustrates one embodiment of channels 24. As illustrated, channel 24 extends from the feed inlet in circuitous or spiral-like fashion along the top surface of section 10 to the feed outlet. With respect to the channel arrangement, it is to be understood that many variations of the embodiment illustrated are possible and are intended to be included in the words "circuitous" or "spiral-like." Other arrangements, for example, could take the form of rectangular shaped or labyrinth shaped channels or passages. Whichever arrangement is utilized, the arrangement should be constructed so as to provide maximum contact time between the two liquids or fluids. It is preferred, although not essential, that the fluids be passed through the cell in opposite directions as shown in FIGURE 2. It has been found that this promotes the diffusion of the contaminants through the membrane.

From the foregoing description and from the accompanying drawings, it will be seen that the present invention provides a novel form of dialysis, that is, a two-phase system of diffusion of water-soluble ionic contaminants from hydrocarbons to water, which is particularly adapted for use in a system for continually monitoring a hydrocarbon stream. In addition, it will be seen that a novel diffusion cell has also been provided which may not only be used in the system of this invention, but also in many other applications of dialysis. It will also be seen that the system of this invention may also be used in testing other types of samples such as a water stream with the membrane serving to protect the conductivity cell from entrained hydrocarbons or dirt in the stream. The system, as mentioned above, may likewise be utilized to determine ionic gases such as HCl, $CO_2$, or the like in gas streams. The membrane system eliminates the need for washing or absorption systems which might otherwise be required, and again protects the measuring system from contamination.

The invention claimed is:

1. Process for determining the concentration of water-soluble ionic contaminants contained in fluid hydrocarbons, said process comprising the steps of:
    (a) intimately contacting water free of water-soluble ionic contaminants with one side of a hydrophilic membrane;
    (b) simultaneously intimately contacting said fluid hydrocarbons with the other side of said hydrophilic membrane for a time sufficient to cause water-soluble ionic contaminants contained in said fluid hydrocarbons to diffuse through said membrane into said water; and
    (c) electrically determining the concentration of water-soluble ionic contaminants contained in said water after diffusion of said water-soluble ionic contaminants from said fluid hydrocarbon into said water, the concentration of water-soluble ionic contaminants in said water being a measure of the concentration of water-soluble ionic contaminants originally contained in said fluid hydrocarbon.

2. The process of claim 1 wherein said hydrophilic membrane is denitrated nitrocellulose.

3. The process of claim 1 wherein electrically determining the concentration of water-soluble ionic contaminants contained in said fluid hydrocarbons after diffusion comprises electrically measuring the pH of said water to determine the hydrogen ion concentration of said contaminants.

4. The process of claim 1 wherein electrically determining the concentration of water-soluble ionic contminants contained in said fluid hydrocarbons after diffusion comprises electrically measuring the chloride ion concentration of said contaminants.

5. The process of claim 1 wherein electrically determining the concentration of water-soluble ionic contaminants contained in said fluid hydrocarbons after diffusion comprises electrically measuring the conductivity of said water, said conductivity being proportional to the concentration of said contaminants.

6. The process of claim 1 wherein said process is provided with the additional steps of passing said water through water purification means after measuring the conductivity of said water to purify said water of said water-soluble ionic contaminants and regenerating said water for contact with said membrane.

7. The process of claim 6 wherein said water purification means is an ion exchange medium.

8. Apparatus for determining the concentration of water-soluble ionic contaminants contained in fluid hydrocarbons, said apparatus comprising:

(a) two-phase dialysis means having a water side and a fluid hydrocarbon side, said water side and said hydrocarbon side being separated by a hydrophilic membrane of denitrated nitrocellulose;
(b) means for introducing water, which is free from any water-soluble ionic contaminants, through said water side so that said water is in fluid communication with said membrane;
(c) means for simultaneously introducing fluid hydrocarbon through said hydrocarbon side so that said fluid hydrocarbon is in fluid communication with said membrane in such a manner that water-soluble ionic contaminants contained in said fluid hydrocarbon will diffuse through said membrane from said fluid hydrocarbon into said water;
(d) electrical measuring means communicating with said water side, said electrical measuring means being adapted to determine the concentration of water-soluble ionic contaminants contained in said water after diffusion of said water-soluble ionic contaminants from said fluid hydrocarbon into said water; and
(e) water deionizing means communicating with the water side of said two-phase dialysis means and with said electrical measuring means so that water may flow from said dialysis means to said electrical measuring means and from said electrical measuring means to said water deionizing means, wherein the water-soluble ionic contaminants are removed from said water, the purified water from said water deionizing means then flowing back to the water side of the two-phase dialysis means.

9. The apparatus of claim 8 wherein said water deionizing means is an ion exchange column.

10. The apparatus of claim 8 wherein said electrical measuring means is a pH electrode, said pH electrode being adapted to determine hydrogen ion concentration of said contaminants.

11. The apparatus of claim 8 wherein said electrical measuring means is a chloride detecting electrode, said electrode being adapted to determine the chloride ion concentration of said contaminants.

12. The apparatus of claim 8 wherein said electrical means is adapted to measure the conductivity of said water, said conductivity being proportional to the concentration of water-soluble ionic contaminants contained in said liquid hydrocarbons.

References Cited

UNITED STATES PATENTS

| 2,571,247 | 10/1951 | Huebotter | 210—321 XR |
| 2,617,766 | 11/1952 | Emmett et al. | 23—253 XR |
| 2,638,419 | 5/1953 | Robichaux | 23—253 XR |
| 2,797,149 | 6/1957 | Skeggs | 23—253 XR |
| 2,864,507 | 12/1958 | Isreeli | 210—94 XR |

OTHER REFERENCES

Bartell, F. G., Anal. Chem. 8, No. 4, July 15, 1936, p. 247.

Haller, J. F. et al., Anal. Chem. 20, No. 7, July 1948, pp. 639 to 642.

MORRIS O. WOLK, Primary Examiner

R. M. REESE, Assistant Examiner

U.S. Cl. X.R.

23—232, 253, 254; 210—21, 25, 96, 321